United States Patent
Schaller

(10) Patent No.: US 11,378,785 B2
(45) Date of Patent: Jul. 5, 2022

(54) MONOCENTRIC RECEPTION ARRANGEMENT

(71) Applicant: JENOPTIK Optical Systems GmbH, Jena (DE)

(72) Inventor: Uwe Schaller, Kahla (DE)

(73) Assignee: JENOPTIK OPTICAL SYSTEMS GMBH, Jena (DE)

( * ) Notice: Subject to any disclaimer, the term of this patent is extended or adjusted under 35 U.S.C. 154(b) by 497 days.

(21) Appl. No.: 16/603,790

(22) PCT Filed: Apr. 9, 2018

(86) PCT No.: PCT/DE2018/100318
§ 371 (c)(1),
(2) Date: Oct. 8, 2019

(87) PCT Pub. No.: WO2018/188693
PCT Pub. Date: Oct. 18, 2018

(65) Prior Publication Data
US 2020/0116981 A1 Apr. 16, 2020

(30) Foreign Application Priority Data

Apr. 10, 2017 (DE) .................... 10 2017 107 615.8

(51) Int. Cl.
*G02B 13/06* (2006.01)
*G02B 3/00* (2006.01)
*G02B 9/64* (2006.01)

(52) U.S. Cl.
CPC ........... *G02B 13/06* (2013.01); *G02B 3/0037* (2013.01); *G02B 9/64* (2013.01)

(58) Field of Classification Search
CPC ........ G02B 13/06; G02B 3/0037; G02B 9/64; G02B 3/0056
See application file for complete search history.

(56) References Cited

U.S. PATENT DOCUMENTS

| 5,012,081 A | 4/1991 | Jungwirth et al. |
| 8,928,988 B1 | 1/2015 | Ford et al. |

(Continued)

FOREIGN PATENT DOCUMENTS

| CN | 105549183 A | 5/2016 |
| DE | 60200370 T2 | 2/2005 |
| EP | 1290483 B1 | 4/2004 |

OTHER PUBLICATIONS

International Search Report from PCT/DE2018/100318 filed Apr. 9, 2018, dated Jul. 9, 2018.

*Primary Examiner* — Wen Huang
(74) *Attorney, Agent, or Firm* — Patentbar International PC

(57) ABSTRACT

A monocentric reception arrangement comprising an optical system (1), in the spherical focal plane (BF) of which the imaged overall image of an object field is subdivided into partial images by field lenses (3.1) of a field lens array (3) arranged here and the partial beams in each case involved in a partial image are collimated by way of a downstream collimator lens (6.1) in each case onto in each case one receiver (5.1) of an optoelectronic receiver array (5). An aperture stop is arranged in a plane of each receiver surface of one of the receivers (5.1), the image of said aperture stop being the entrance pupil, in the center of which lies the common center of curvature (MP) of the spherical entrance surface (2) and the curvature of the field lens array (3). Each partial beam illuminates one of the receiver surfaces with the same beam diameter.

9 Claims, 4 Drawing Sheets

(56) References Cited

U.S. PATENT DOCUMENTS

2011/0211106 A1 9/2011 Marks et al.
2013/0076900 A1 3/2013 Mrozek et al.

MONOCENTRIC RECEPTION ARRANGEMENT

RELATED APPLICATIONS

This Application is a US National Phase application of International Application PCT/DE2018/100318, filed on Apr. 9, 2018, which in turn claims priority to German Patent Application DE 10 2017 107 615.8, filed Apr. 10, 2017, both of which are incorporated herein by reference in their entirety.

FIELD OF THE INVENTION

The invention relates to a monocentric reception arrangement as it is generically known from DE 602 00 370 B2.

BACKGROUND OF THE INVENTION

A large number of monocentric (also called concentric) reception arrangements with an optoelectronic receiver array, in particular a spherically curved receiver array, are known from the state of the art. Such reception arrangements are characterized by the fact that they image light from a very large object area (also called object field, observation field, scan field or field of view) into a spherically curved (spherical) focal plane, which is why they are also called ultra wide angle reception arrangements. Partial beams coming from the object area, which each comprise the parallel beams of one direction entering through the entrance pupil of the reception arrangement and whose main beam passes through the center of the entrance pupil, are imaged into a focal point which lies on a spherical focal plane. The center of curvature of the spherical focal plane, as well as the center of curvature of all optically effective surfaces of the optical system arranged upstream in the beam incidence direction, lies in a common point, which is why such an optical system is referred to as monocentric. In the prior art reception arrangements of this type, either a large receiver array, covering the entire image field on which a real overall image of the object area is imaged, or several receiver arrays (CCD matrix, pixel array), on which real partial images of the overall image are produced, is/are arranged either in the spherical focal plane or in a conjugated, likewise spherical plane.

EP1 290 483 B1 discloses a concentric sensor system with an ultra wide angle field of view, which represents a monocentric reception arrangement in the sense of the invention. Through an entrance pupil, which is arranged in a plane of the common center of curvature of all optically effective surfaces, partial beams emerge from different directions of incidence and are focused into a spherical focal plane, which lies behind the last optically effective surface. In a first embodiment, a pixelated sensor surface is arranged here so that a real image forms thereon.

In a second embodiment, the entrance surfaces of a curved fiber-optic transmitter are arranged in the spherical focal plane, said entrance surfaces directing the light to an image intensifier tube, where the signals are amplified for subsequent viewing.

The aforementioned DE 602 00 370 T2 discloses a concentric ultra wide angle scanner system with a partly flat detector arrangement, which also represents a monocentric reception arrangement. In contrast to a previously used spherically curved receiver array arranged in a spherical focal plane, a receiver array partly consisting of a flat sensor chip arrangement (partial array) should be usable here. The partial arrays are then each located in a plane tangential to a spherical plane.

An optical imaging system comprising monocentric primary optics and a secondary optical module is known from U.S. Pat. No. 8,928,988 B1. The secondary optical module forms a plurality of individual imaging channels, through each of which a part of the light incident via the monocentric primary optics is projected onto a downstream receiver. In order to produce a complete image, the receivers arranged in the image plane must border each other without gaps, which is very difficult to put into practice.

Further monocentric reception arrangements of the same generic type, by which a real overall image or real partial images of an object area are generated, are known from U.S. 5,012,081 A, U.S. Pat. No. 8,830,377 B2 and U.S. Pat. No. 9,329,365 B2.

Using a receiver array, the image field is basically structured into the receiver surfaces of the individual receivers, said structuring causing information and energy to be lost when imaging the light, if the receiver surfaces do not completely cover the spherical focal plane. CCD matrices, in particular, are used for the imaging reception arrangements of the prior art. The receiver surfaces (pixels) of CCD matrices are exposed simultaneously over an integration time and then read out in rows, which is why a loss of energy can be compensated by a longer integration time. In the prior art reception arrangements of the same generic type, a wide variety of design measures are also taken in order to achieve a high image quality in order to avoid loss of information and energy, e.g. by using several lenses of different materials, which makes reception arrangements complex and cost-intensive.

CCD matrices and other optical image sensors, in which the individual receivers (pixels) are exposed simultaneously and then read out one after the other, are not suitable for the detection of individual light pulses while simultaneously avoiding the detection of ambient light. Furthermore, if a single light pulse is detected, an energy loss cannot be compensated by a longer integration time of the receiver. In order to be able to detect short light pulses or weak light pulses using the reception arrangement, an energy loss during the transmission of the light pulse to the receiver array must be avoided.

The light pulses can, for example, come from a transmitter located in the object area or be laser pulses coming from a laser scanner and reflected in the object area.

SUMMARY OF THE INVENTION

The object of the invention is to improve a monocentric reception arrangement in such a way that it uses a receiver array to detect light pulses, which arrive from an object area simultaneously or consecutively, without loss of information or energy due to the structuring of the receiver array.

The object is achieved by a reception arrangement according to claim 1.

Advantageous embodiments are indicated in subclaims 2 to 9.

Using a reception arrangement according to the invention, it is possible to transmit individual light pulses arriving from a large object area to the individual receivers of an optoelectronic receiver array virtually loss-free. Thus, each partial beam of a light pulse passing through the reception arrangement is directed onto exactly one receiver of the optoelectronic receiver array, where it causes complete illumination of the receiver surface of the respective receiver.

It is essential to the invention that the reception arrangement comprises a plurality of reception channels, each of which, in the optical sense, represents a telescope with a downstream receiver located in the aperture stop. This telescope focuses the light of the partial beams coming from a part of the object area into a focal point and then collimates it onto the receiver so that the receiver is irradiated with parallel light.

The object area represents the solid angle area from which incoming light pulses can be received by the reception arrangement. Said area is defined by a horizontal and a vertical aperture angle of the reception arrangement; the horizontal aperture angle can be e.g. 90° and the vertical aperture angle can be e.g. 20°.

The principle of the reception arrangement allows the horizontal and vertical aperture angles to be scaled up to 180°.

The reception arrangement basically contains a monocentric optical system with a spherical entrance surface whose center of curvature lies in the plane of an imaged entrance pupil of the reception arrangement. Partial beams in the sense of this description represent a bundle of parallel beams limited by the entrance pupil, coming from the object area and each having an axial beam passing through the center of curvature of the spherical entrance surface.

As in the prior art, the partial beams are each focused on a spherical focal plane. In contrast to the state of the art, however, neither at least one receiver array is arranged in the spherical focal plane nor is the latter imaged on at least one receiver array. Only a field lens array is arranged here. While the partial beams each focused centrally onto a field lens of the field lens array pass through the field lens uninfluenced, the partial beams which are focused more strongly towards the edge of the field lenses are refracted towards the optical axis of the field lens, so that the field lenses, without thereby acting optically to image the focused partial beams, each sharply delimit a reception channel in which the partial rays coming from a partial region of the object region are guided. The reception channels are each formed by the optical system with one of the field lenses of the field lens array formed on it, a collimator lens of a collimator array, which may also be formed by a lens group, and a single receiver of the optoelectronic receiver array. Since the field lenses each limit the cross-section of a reception channel, the partial beams passing through them are also safely guided only to the downstream receiver, even if the downstream collimator lens and the receiver surface of the receiver are smaller in diameter than the extent of the field lens in order to position them close to the field lens. The field lenses can have any grid-forming geometry to completely cover the spherical focal plane and thus the image field of the imaged object area. Thus, despite structuring the image field into the receiver surfaces of the individual receivers, no loss of information or energy can occur.

Via each individual reception channel, the partial beams from one respective partial area of the object area are received. For example, the partial areas may correspond to a section of the object area of 5°×5° and are determined by the size of the field lenses, which are arranged adjacent to each other in the spherical focal plane and without gaps and overlapping. How much radiation intensity is directed from each of the partial areas to a receiver surface is primarily determined by the receiver chosen and thus the size of the receiver surface, since its limitation embodies the respective aperture stop of a reception channel. The aperture stop of each reception channel is imaged as the entrance pupil via the respective collimator lens and field lens into a plane in which the common center of curvature of the optical system lies. The magnification between the aperture stop, which is determined by the size of the receiver surface, and the entrance pupil determines the size of the entrance pupil and thus the opening of each reception channel through which the partial beams pass to the respective receiver. This means that if the reception channels were dimensioned differently, especially with aperture stops of different sizes, the size of the entrance pupil would be different for the different reception channels due to the different sizes of the receiving surfaces. This could be of interest, if the radiation intensity in the object field differs locally to a non-negligible degree and this difference is known. As a rule, the magnification of the reception channels is the same, however. In order to simplify the description of the invention, it is therefore assumed that the reception channels and thus also the receiving surfaces are of the same dimension, which is why it is simply assumed that the entrance pupils of the same size coincide to form an entrance pupil of the reception arrangement. Irrespective of whether the entrance pupil for the individual reception channels is of different size or of the same size, each partial beam of a respective partial area impinges on one of the receivers with the same beam cross-section and optimally fills its receiver surface.

Since, in contrast to the state of the art, no image is produced on the receiver surfaces, but these are illuminated, the beam cross-section of the incident partial beams is adapted to the shape of the receiver surface, independent of the geometry of the partial image, which in turn is determined by the circumferential geometry of the field lenses.

Avalanche photodiodes are preferred as receivers, with which short light pulses in particular can be effectively detected. Commercially available individual avalanche photodiodes have a round receiver surface, but may also be designed with a square receiver surface. They are also available as finished arrays with a much smaller number of receiver surfaces and a much smaller fill factor compared to other receiver arrays. Such finished arrays may be used advantageously as partial arrays for forming the receiver arrays.

BRIEF DESCRIPTION OF THE DRAWINGS

The invention will be explained in more detail below with reference to exemplary embodiments and drawings.

In the Figures.

DETAILED DESCRIPTION OF THE PREFERRED EMBODIMENTS

Figure 1A:
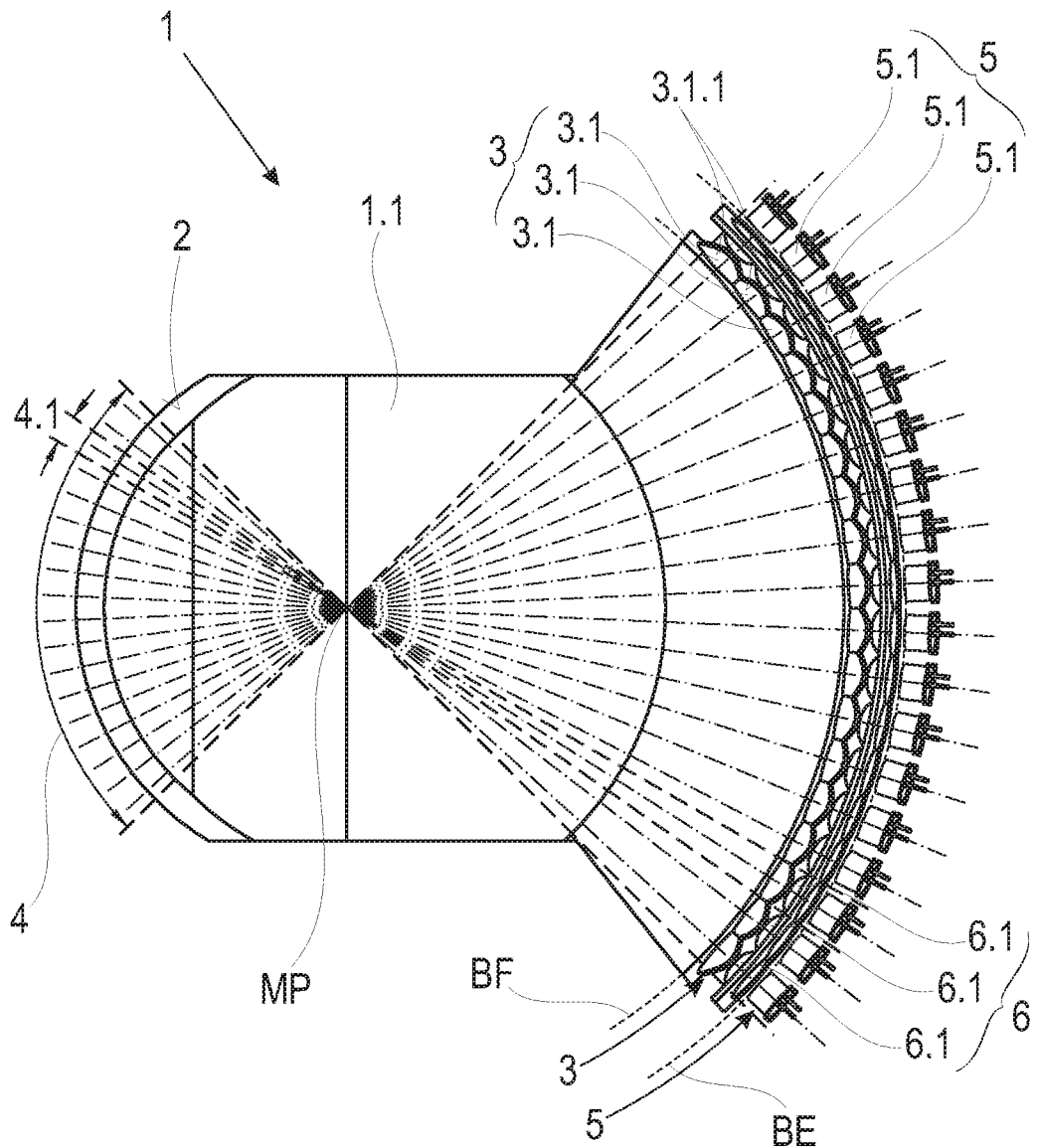
FIG. 1A shows a schematic diagram of a first exemplary embodiment of a reception arrangement.
Figure 2:
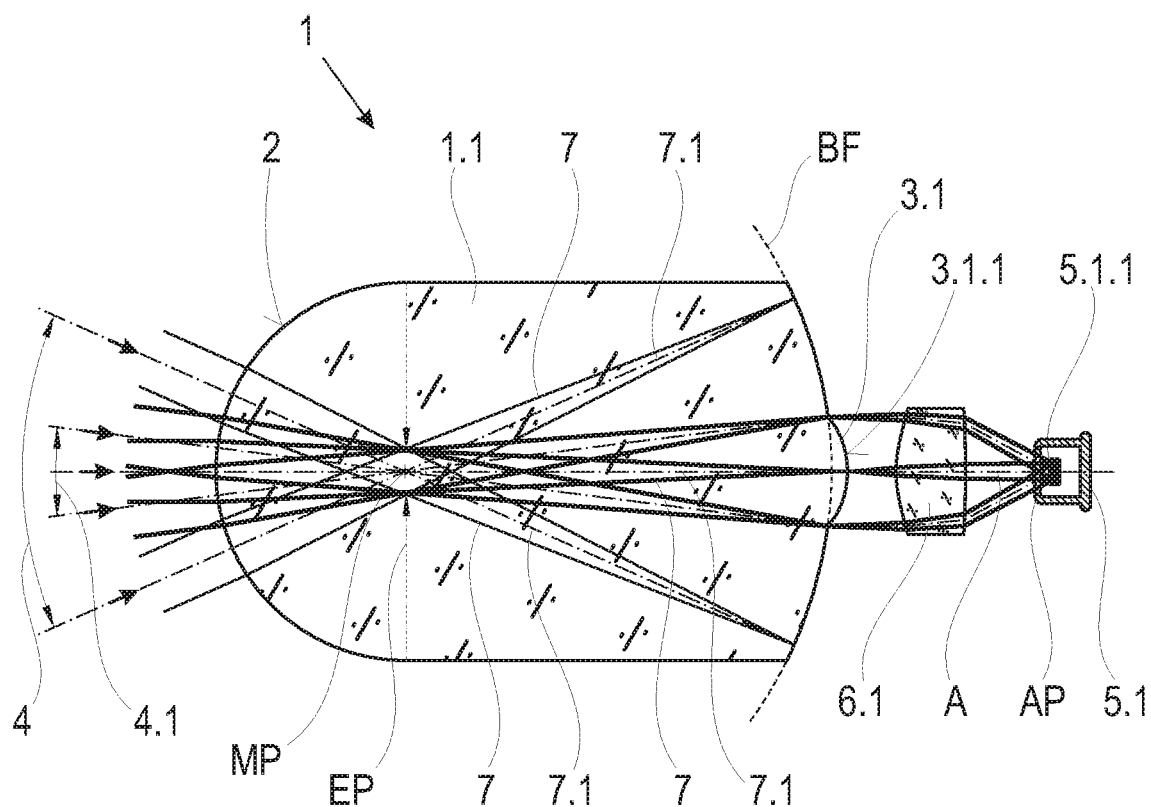
FIG. 2 shows a schematic diagram of a reception channel of the first exemplary embodiment of a reception arrangement according to FIG. 1A.

A monocentric reception arrangement according to the invention comprises, as schematically shown in FIG. 1A, an optical system 1 having a spherical entrance surface 2 and an exit surface formed by field lens surfaces 3.1.1 of field lenses 3.1 of a spherically curved field lens array 3 disposed on a spherical focal plane BF of the optical system 1. The centers of curvature of the spherical entrance surface 2, the spherical focal plane BF and thus the curvature of the field lens array 3 coincide in a common center of curvature MP, which is why the optical system 1 is a monocentric system. In a plane enclosing the center of curvature MP, an entrance pupil EP is imaged, the center of which coincides with the center of curvature MP, so that axial beams 7.1 of each parallel partial beam 7 passing through the entrance pupil EP pass through the center of curvature MP and impinge uninfluenced on a point in the spherical focal plane BF into which the respective partial beam 7 is focused. See also FIG. 2 in this regard, which shows the incidence of several partial beams 7 and a reception channel, as explained later. For the partial beams 7 of parallel light, the spherical focal plane BF represents the image field. It is clear to the person skilled in the art that the term focal plane is used here because of its optical effect and that it is not a plane in the geometric sense.

The field lens array 3 consists of a multitude of field lenses 3.1, whose field lens surfaces 3.1.1 form a contiguous surface, which represents the exit surface of the optical system 1. They are preferably rectangular in circumference and arranged adjacent to each other in rows and columns. The field lenses 3.1 may deviate from ideal rectangles due to the curvature of the field lens array 3. Advantageously, they may also be triangular in shape. Since the partial images limited by the field lenses 3.1 are not imaged, it generally does not matter which shape the field lenses 3.1 have. Their shape may be selected independently of the shape of the receiver surface 5.1.1 of the receivers 5.1, without part of the receiver surface 5.1.1 remaining unused.

The shape and size of the field lenses 3.1 define in each case a partial area 4.1 of an object area 4 of the reception arrangement, from which the partial beams 7 are guided into one of the reception channels.

Downstream of each field lens 3.1, there are arranged a collimator lens 6.1 and a receiver 5.1. Together with the optical system 1 and with one of the field lenses 3.1 formed on each of them, they form a reception channel with an optical axis A passing through the center of the field lens surface 3.1.1 and the center of curvature MP. Partial beams 7 passing through the entrance pupil EP and focused into the spherical focal plane BF are each collimated via one of the collimator lenses 6.1 onto that one of the receivers 5.1 which is arranged downstream of the field lens 3.1 covering the area of the spherical focal plane BF into which the respective partial beam 7 is focused. It will be readily apparent to the person skilled in the art that each reception channel has its own entrance pupil. However, since these are formed in a plane in which the center of curvature MP is located, their position deviation, which is limited to tilting, can be neglected and it can be assumed that the entrance pupils of the reception channels coincide in an entrance pupil EP of the reception arrangement. The receivers 5.1 each have a receiver surface 5.1 that is located in one plane with the aperture stop AP. Physically, the boundary of the receiver surface 5.1.1 preferably constitutes the aperture stop AP. The image of each of the aperture stops AP of the individual reception channels represents the entrance pupil EP.

The receivers 5.1, which together form the receiver array 5, are arranged relative to each other such that their receiver surfaces 5.1.1 are arranged on a spherical surface BE having a center of curvature coinciding with the common center of curvature MP of the spherical entrance surface 2 and the spherical focal plane BF. The collimator lenses 6.1 then each have the same focal length. Alternatively, the receivers 5.1, which together form the receiver array 5 or each form a partial array 5.2 in groups, are arranged relative to one another in such a way that their receiver surfaces 5.1.1 are arranged in tangential planes TE to a spherical surface BE, which has a center of curvature that coincides with the common center of curvature MP of the spherical entrance surface 2 and the spherical focal plane BF. The collimator lenses 6.1 then have a different focal length, so that the entrance pupil EP forms as an image of the aperture stop AP in a plane containing the center of curvature MP for each of the reception channels assigned to the partial array 5.2, as intended.

As the image of the aperture stops AP of each reception channel coincide, all the partial beams 7 passing through one of the reception channels each have a beam cross-section of the same size in the plane of the receiving surface 5.1.1 and all the axial beams 7.1 of the partial beams 7 passing through one of the reception channels intersect the optical axis A in the plane of the receiving surface 5.1.1 of this reception channel so that the partial beams 7 illuminate the receiving surface 5.1.1 to the same extent. Deviations from this are possible due to tolerances. Also, deviations of the beam cross-section from the geometry of the aperture stop AP, as they occur with oblique incidence of light, are neglected here.

Advantageously, receivers 5.1 with a round receiver surface 5.1.1 are used. In contrast to the prior art, where distances between the receivers or the receiver surfaces always lead to a loss of energy, no loss of energy resulting from distances between the receivers 5.1 can occur here, since all light incident through the entrance pupil EP is directed onto one of the receivers 5.1.

The optical system 1 can be designed differently for different embodiments of the monocentric reception arrangement.

According to a first example, shown in FIG. 1A, the optical system 1 is designed as a monolithic lens block 1.1 and thus has only two optically effective boundary surfaces, namely the spherical entrance surface 2 and the exit surface formed by the field lens surfaces 3.1.1 of the field lenses 3.1 of the field lens array 3. Such an optical system 1 is particularly stable and easy to install and adjust.

Figure 1B:
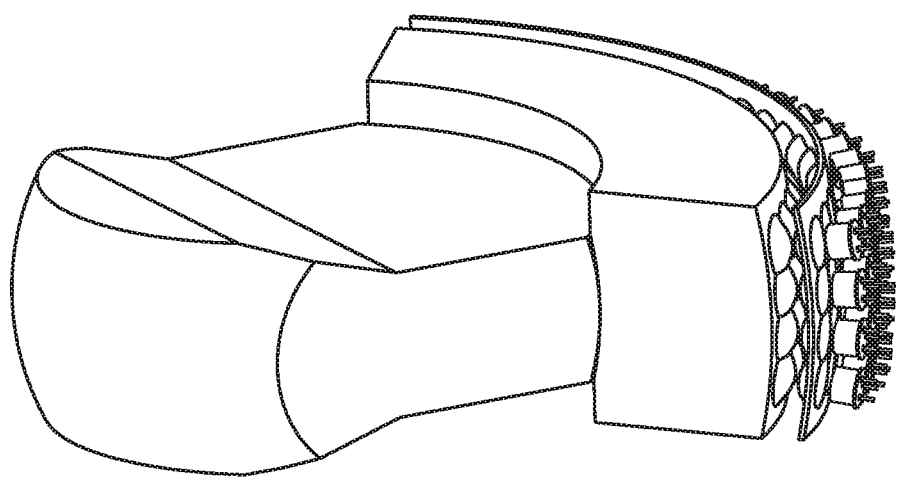
FIG. 1B shows a perspective view of the first exemplary embodiment of a reception arrangement according to FIG. 1A.

A practical execution is shown in a perspective view in FIG. 1B. The field lenses 3.1 of the field lens array 3 are machined from the monolithic lens block 1.1.

Figure 3:
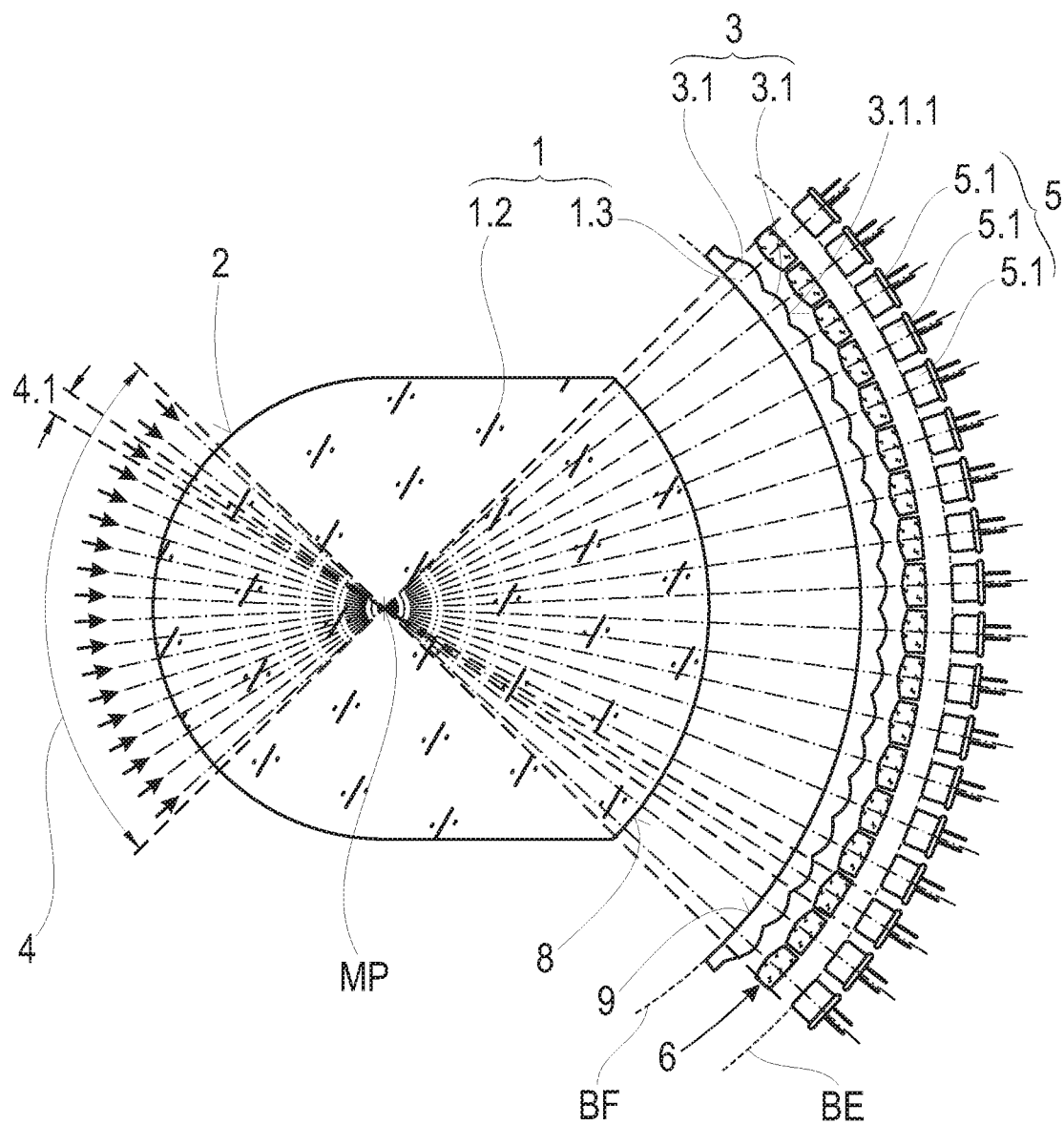
FIG. 3 shows a schematic diagram of a second exemplary embodiment of a reception arrangement.

According to a second exemplary embodiment, shown in FIG. 3, the optical system 1 is composed of several lens bodies, in this case a first lens body 1.2 and a second lens body 1.3. On the first lens body 1.2, the spherical entrance surface 2 and a first spherical intermediate surface 8 are formed in the direction of incidence. On the second lens body 1.3 a second spherical intermediate surface 9 and the exit surface are formed. The centers of curvature of the first and second spherical intermediate surfaces 8, 9 also coincide with the common center of curvature MP. The first lens body 1.2 and the second lens body 1.3 have a distance along the optical axis A which is calculated such that the field lens array 3, which is machined here on the second lens body 1.3, is arranged on the spherical focal plane BF of the optical system 1.

Such a design of the optical system 1 can be used advantageously if the spherical entrance surface 2 is exposed to environmental pollution or the danger of damage and should be replaceable. In addition, the first and second lens bodies 1.2, 1.3 may be made of different materials.

The field lenses 3.1 must form a coherent field lens array 3. Only in this way can the field lens surfaces 3.1.1 border each other without gaps, so that each partial beam 7 focused on the spherical focal plane BF is transmitted via one of the reception channels.

The collimator lenses 6.1 must be arranged in a collimator array 6 that is compatible with the field lens array 3 and the receiver array 5, without necessarily being connected to each other. As shown as an example in FIG. 1B, they are also advantageously monolithically connected to each other, which simplifies their mounting and fixing.

In the exemplary embodiments shown in FIGS. 1A, 1B and 3, the collimator lenses 6.1 are of the same design and the receiver surfaces 5.1.1 of the receivers 5.1 are arranged on a spherical surface BE.

Figure 4:
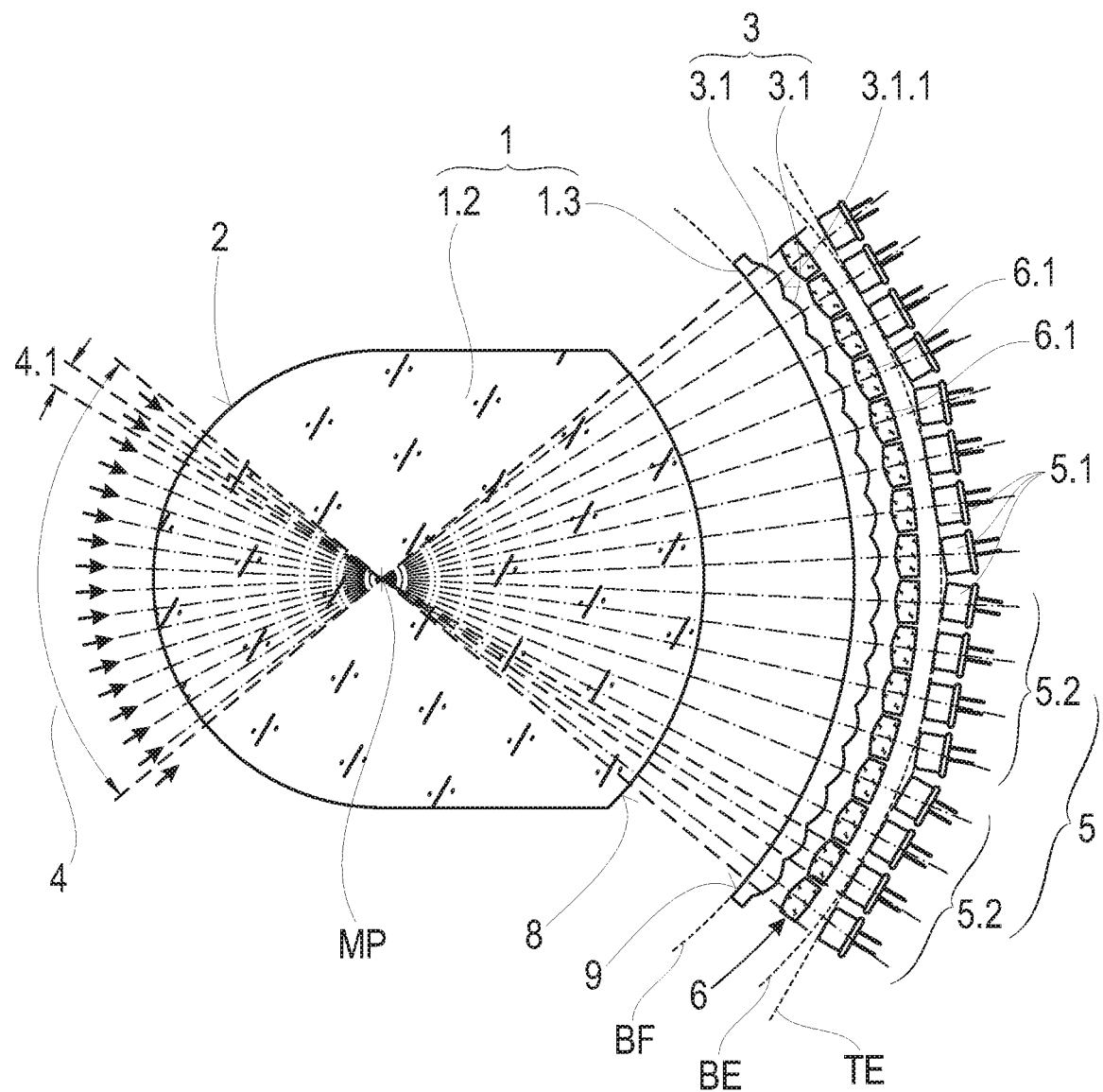
FIG. 4 shows a schematic diagram of a third exemplary embodiment of a reception arrangement.

In a third example shown in FIG. 4, the receiver surfaces 5.1.1 of individual groups of receivers 5.1, each forming a partial array 5.2, are arranged in tangential planes TE to a spherical surface BE. This makes it possible to use standard planar arrays as partial arrays 2.5.

LIST OF REFERENCE NUMERALS

1 optical system
1.1 lens block
1.2 first lens body
1.3 second lens body
2 spherical entrance surface
3 field lens array
3.1 field lenses
3.1.1 field lens surface
4 object area
4.1 partial area (of the object area 4)
5 receiver array
5.1 receiver
5.2 partial array
5.1.1 receiver surface
6 collimator array
6.1 collimator lens
7 partial beam
7.1 axial beam (of the partial beam 7)
8 first spherical intermediate surface
9 second spherical intermediate surface
EP entrance pupil
BF spherical focal plane
BE spherical surface
TE tangential plane
AP aperture stop
MP (common) center of curvature (of spherical entrance surface 2 and spherical focal plane BF)
A optical axis

What is claimed is:

1. A monocentric reception arrangement comprising:
    an optical system having a spherical entrance surface, an exit surface and a spherical focal plane (BF), wherein centers of curvature of the spherical entrance surface and of the spherical focal plane (BF) coincide in a common center of curvature (MP) located in a center of an entrance pupil (EP) of the reception arrangement;
    an optoelectronic receiver array arranged downstream of the optical system, the receiver array comprising individual receivers;
    a reception channel formed by each of the individual receivers and the optical system, each optical axis (A) of each reception channel passing through the center of curvature (MP);
    the exit surface of the optical system being formed by field lens surfaces of field lenses of a field lens array, the field lenses being arranged on the spherical focal plane (BF), each field lens with a respective downstream collimator lens of a collimator array being assigned to one of reception channels, so that partial beams passing through the entrance pupil (EP) and focused into the spherical focal plane (BF) are each directed onto that one of the individual receivers positioned downstream of the field lens covering such area of the spherical focal plane (BF) into which a respective partial beam is focused; and
    a receiver surface of each of the receivers comprising an aperture stop (AP) representing the entrance pupil (EP) so that all partial beams on the receiver surface passing through a respective one of the reception channels have the same beam diameter and one axial beam of each of these partial beams intersects the optical axis (A) of the reception channel.

2. The monocentric reception arrangement according to claim 1, wherein the field lenses are square and adjoin one another without gaps.

3. The monocentric reception arrangement according to claim 1, wherein the optical system is a monolithic lens block.

4. The monocentric reception arrangement according to claim 1, wherein the optical system has at least two lens bodies.

5. The monocentric reception arrangement according to claim 4, wherein the at least two lens bodies are made of different materials.

6. The monocentric reception arrangement according to claim 4, wherein the at least two lens bodies are a first lens body and a second lens body spaced apart from one another.

7. The monocentric reception arrangement according to claim 1, wherein the receivers are avalanche photodiodes with a round receiver surface.

8. The monocentric reception arrangement according to claim 1, wherein each collimator lens has an identical focal length and wherein the receiver surfaces of the receivers forming the receiver array are arranged on a spherical surface (BE), the spherical surface having a center of curvature that coincides with the common center of curvature (MP) of the spherical entrance surface and the spherical focal plane (BF).

9. The monocentric reception arrangement according to claim 1, wherein collimator lenses have different focal lengths and the receiver surfaces of the receivers forming the receiver array or, in groups, the receiver surfaces of the receivers forming a partial array are arranged in tangential planes (TE) to a spherical surface (BE) having a center of curvature coinciding with the common center of curvature (MP) of the spherical entrance surface and the spherical focal plane (BF).

* * * * *